(12) United States Patent
Ward

(10) Patent No.: US 6,217,205 B1
(45) Date of Patent: Apr. 17, 2001

(54) COLD COUPLING APPARATUS AND METHOD

(75) Inventor: Patrick H. Ward, San Antonio, TX (US)

(73) Assignee: Lucifer Lighting Co., San Antonio, TX (US)

( * ) Notice: Subject to any disclaimer, the term of this patent is extended or adjusted under 35 U.S.C. 154(b) by 0 days.

(21) Appl. No.: 09/443,620

(22) Filed: Nov. 19, 1999

(51) Int. Cl.[7] .............................. F21V 8/00; F21V 29/00
(52) U.S. Cl. ............................. 362/580; 362/581; 385/93
(58) Field of Search ........................... 385/33, 88, 89, 385/93, 94; 362/551, 554, 581, 582, 583, 294, 457, 580

(56) References Cited

U.S. PATENT DOCUMENTS

| | | | |
|---|---|---|---|
| 4,773,723 | 9/1988 | Cuda | 385/89 |
| 5,006,965 | 4/1991 | Jones | 362/552 |
| 5,074,682 | * 12/1991 | Uno et al. | 385/93 |
| 5,099,399 | 3/1992 | Miller et al. | 362/580 |
| 5,315,683 | 5/1994 | Miller | 385/136 |
| 5,901,262 | * 5/1999 | Kobayashi et al. | 385/89 |
| 6,092,935 | * 7/2000 | Althaus et al. | 385/93 |
| 6,155,724 | * 12/2000 | Ichino et al. | 385/92 |

* cited by examiner

Primary Examiner—Alan Cariaso
(74) Attorney, Agent, or Firm—Jenkens & Gilchrist

(57) ABSTRACT

A cold coupling apparatus for receiving light from a source of illumination and transmission to the ends of one or more light-guiding fibers comprises a coupler body having one or more lenses are typically disposed within the coupler body; a compression fitting is engaged with the retention means; a collet is typically disposed within the compression fitting, as are one or more ferrules, and one or more rods, or a slug. The coupler body may be actively cooled, or may have heat sink fins attached to its exterior. A method of cooling a plurality of light-guiding fibers comprises the steps of inserting a plurality of fibers and a corresponding plurality of ferrules, along with a plurality of rods, into a thermally conductive coupler body. Each ferrule is placed over the end of a corresponding fiber, so as to expose the fiber end, and partially cover the fiber jacket. The ferrules are also placed in physical contact with the rods, which are in parallel alignment with the longitudinal axes of the fibers. The coupler body engages with a compression fitting so as to create a continuous thermal path from the fibers to the coupling body, by securing the fibers, ferrules, and rods within the coupling body, each in physical contact with the other. The method may include adding a heat sink to the exterior of the coupler body, and actively cooling the coupler body.

27 Claims, 4 Drawing Sheets

COLD COUPLING APPARATUS AND METHOD

CROSS-REFERENCE TO RELATED APPLICATION

Reference is made to co-pending U.S. patent application Ser. No. 09/084,653 filed May 26, 1998, now U.S. Pat. No. 6,113,285 entitled "Illuminator Heat Dissipation System" by Patrick Ward.

BACKGROUND OF THE INVENTION

1. Technical Field

This invention relates generally to the field of fiber optic illuminators, and more particularly to an apparatus for coupling light from the source of illumination to individual fibers, while minimizing the heat transmitted thereto.

2. History of Related Art

Fiber optic illuminators generally provide a source of intense light at the end of an optical fiber, or an optical fiber bundle. As used herein, the term "fiber" is a generic term that means any type of light guide having one or more individual channels which permit light energy to be transmitted along a distance. Thus, a "fiber" includes single and multi-stranded glass and plastic fiber optic wave guides, mirrored channels of all geometric shapes, and other identical or similar light energy transmission media. Glass fibers are heat resistant and readily available, however, they are usually quite expensive in comparison to plastic fibers, which have a soft core construction, in which the flexible core is sheathed in a thin-walled tube of heat-resistant plastic. The light-transmitting core (either solid or stranded) of such plastic fibers can be operated at temperatures as high as 140° C., but after long-term use, polymer cross-linking is affected, and the core ages, discolors, and becomes brittle. In fact, this is so well known in the industry that some manufacturers recommend building "service loops" into plastic fiber installations so that the aged plastic can be cut away after time and replaced with fresh fiber that has not been placed in close proximity to the source of illumination.

Heat degradation is not the only problem encountered when using plastic fibers. There is also the difficulty of infrared and ultraviolet radiation. Commonly available halogen and metal halide lamps used to illuminate the ends of fibers produce a substantial amount of infrared and ultraviolet energy. The infrared energy is mostly dissipated after a few inches of travel down the fiber, however, the ultraviolet energy travels with the light and goes along the length of the fiber, damaging the entire length of the fiber by affecting the cross-linking ability of the polymers used to make it.

Various approaches have been attempted to provide sufficient light to the fiber ends, while preventing the fibers from overheating. Such thermal control techniques include the use of dichroic reflector lamps, defocusing the lamp image, cooling fans, infrared-reflecting dichroic mirrors, and optically-tuned heat absorbers.

In one method a fan-assisted heat dissipator, comprising a fan and motor, are mounted behind the light source and draw external air through passages within a heat sink, which in turn surrounds an optical fiber. A glass rod is interposed between the end of the fiber and the source so as to prevent direct reception of the focused beam at the fiber end surface. In operation, the fan serves to draw external air through the heat sink, so as to cool the glass rod and the source. The cooling air passes onward, and is exhausted. To reduce the amount of cooling required, the glass rod serves as a relatively non-heat conductive medium for the transmission of light. However, a significant amount of optical attenuation occurs with this particular implementation, wherein several dissimilar interfaces have been interposed between the source, and the end of the fiber. Such dissimilar material interfaces are problematic because the optical output angle of the glass rod differs from the optical acceptance angle of plastic fiber, which impedes light transmission.

When multiple fibers are illuminated, another approach has typically been employed. In this case, air is typically drawn through the interstices of several unitary fibers, or stranded fibers, of a fiber bundle heat dissipator. A heat sink body, having fins, serves to radiate some of the heat in the fibers, which are clamped together within a collar, surrounded by a strap. A tightening screw is used to help maintain alignment of the fiber bundle within the heat sink body, but over-tightening often results in deformation of the individual fibers. This particular method may be used in conjunction with a glass rod, as described above. However, using such a system results in an undesirable reduction of the light received by each of the fibers within the heat sink body.

Even when multiple fibers are securely clamped together, another problem arises. Unless the fibers are somehow individually secured, those located toward the inner portion of the bundle tend to slide out of place each time the bundle is moved. The result is that the fibers at the center of the bundle often move into a less than optimal position for reception of source illumination. Another difficulty with such a simple compression arrangement is that some configurations of fiber bundling lend themselves to irregular compressive forces and result in damage to individual fibers, or distortion and uneven transmission of light. Finally, if several fibers in the bundle are of unequal diameter, a simple compression arrangement to contain the fibers within the heat dissipation apparatus usually fails to evenly distribute pressure among the fibers and contributes to distortion and/or a reduction in the amount of light transmitted by the fibers from the source to the ultimate destination.

Therefore, what is needed is a heat dissipation apparatus, or "cold coupling" apparatus, and method which act to effectively filter out infrared and ultraviolet radiation, while employing the least number of optical interfaces along the path from the source of illumination to the end of the fibers. It is further desired to provide such an apparatus and method that do not deform bundles of fibers due to excessive clamping force, and which effectively retains fibers in place within the apparatus. Further, it is desirable to provide such an apparatus and method which maintain the temperature of plastic fibers at 140° C. or less, without the use of a fan, in conjunction with commonly available illumination sources.

SUMMARY OF THE INVENTION

The present invention is embodied by a cold coupling apparatus for receiving light from a source of illumination and transmitting the light to the ends of one or more light-guiding fibers, such as solid core, stranded core, or liquid core fibers. The apparatus comprises a coupler body having a retention means formed thereon, an exit bore, an inner bore, and an entry bore, wherein the exit bore and inner bore intersect to form a lens shelf, and the entry bore and inner bore intersect to form a fiber shelf; a lens disposed within the coupler body, either in the exit bore or in the inner bore and proximate to the lens shelf; a compression fitting engaged with the retention means; a collet disposed within the compression fitting; one or more ferrules, each of the ferrules disposed within the entry bore and proximate to the fiber shelf; and one or more rods, or a slug to maintain the fiber bundle position with respect to the illumination source. The apparatus of the present invention may further comprise a bushing disposed within the compression fitting, a lens coated to reflect infrared and/or ultraviolet radiation, and heat sink fins attached to the exterior of the coupler body.

The cold coupling apparatus may also comprise a lens ring disposed within the exit bore (or inner bore), wherein the lens is retained between the lens ring and the lens shelf. The exit bore (or inner bore) may include a ring groove, and the lens ring may be retained within the exit bore (or inner bore) using the ring groove. The ferrules and rods (or slug) provide a thermally conductive path from the fibers to the coupler body.

A plurality of lenses may be disposed within the coupler body, either in the exit bore or the inner bore. Further, the coupler body may be actively cooled.

The invention may also be characterized as a method of cooling a plurality of lightguiding fibers. The method comprises the steps of inserting a plurality of fibers and a corresponding plurality of ferrules into a thermally conductive coupler body. Also inserted are a plurality of rods, either solid or hollow. Each ferrule is typically placed over the end of a corresponding fiber, so as to expose the fiber end, and partially cover the fiber jacket. The ferrules are also placed in physical contact with the rods, which are in parallel alignment with the longitudinal axes of the fibers. The coupler body engages with a compression fitting so as to create a continuous thermal path from the fibers to the coupling body, by securing the fibers, ferrules, and rods within the coupling body, each in physical contact with the other. The method may include adding a heat sink to the coupler body, and actively cooling the coupler body.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
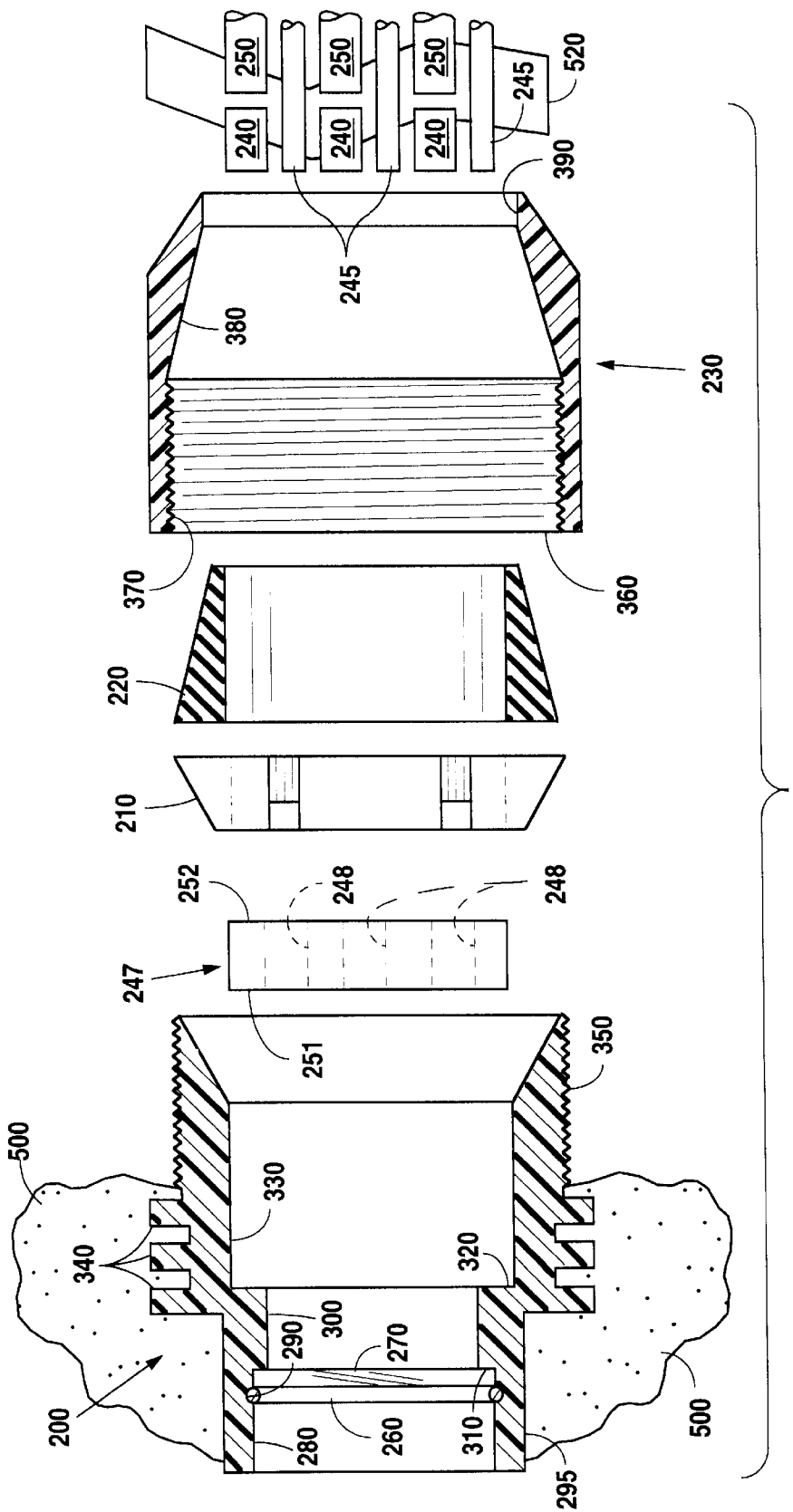
FIG. 1 is a side, cut-away, exploded view of a preferred embodiment of the present invention.

Turning now to FIG. 1, an exploded view of one embodiment of the cold coupling apparatus 190 of the present invention can be seen. The apparatus 190, when used in conjunction with one or more optical fibers 250, has six major components: a lens 270, a coupler body 200, a collet 210, one or more rods 245, a compression fitting 230, and one or more ferrules 240.

The coupler body 200 is typically formed as a tubular structure having an exit bore 280 which intersects with an inner bore 300 having a lesser diameter than the exit bore 280, to form a lens shelf 310. Even though not shown in the figure, the present invention contemplates the accommodation of one or more lenses 270 within the exit bore 280. However, in the preferred embodiment, a single lens is used to reduce the number of optical interfaces encountered by light as it travels from the source of illumination to the optical fiber ends. The lens 270 may be similar to, or identical to, Optivex part no. DF-410. The lens 270 is preferably coated to prevent passage of ultraviolet and infrared radiation. As mentioned previously, if desired, more than one lens 270 may be used, and, if applicable, each lens 270 may be coated with a different filtration material. In the alternative, and more preferably, a single lens with multiple coatings may be used. The lens 270 is loosely retained against the lens shelf 310 by disposition between the lens shelf and a lens ring 260, which may be retained in the exit bore by way of groove 290.

Figure 2:
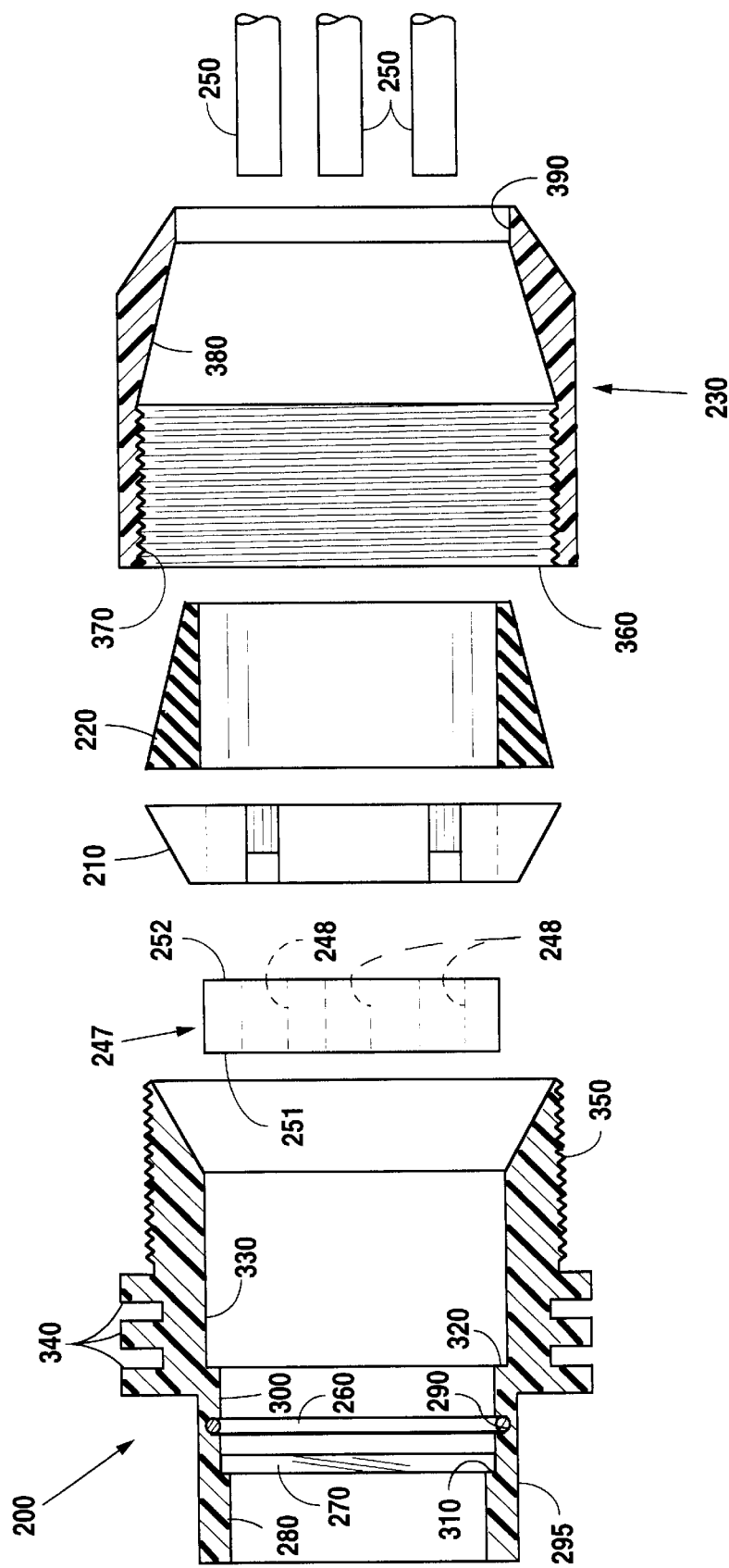
FIG. 2 is a side, cut-away, assembled view of an alternative embodiment of the present invention.

As can be seen in FIG. 2, the lens 270 may also be disposed in the inner bore 300 of the coupler body 200, as an alternative to the placement shown in FIG. 1. If this is the case, then the groove 290 is also disposed in the inner bore 300, as is the lens ring 260. As described above, loose retention of the lens 270 against the lens shelf 310 is preferred to accommodate thermal expansion of the coupler body and/or the lens 270. In this case, the inner bore 300 has a greater diameter than the exit bore 280.

The coupler body 200 also comprises an entry bore 330, which is of a larger diameter than the inner bore 300. The entry bore 330 and the inner bore 300 intersect to form a fiber shelf 320. The coupler body 200 also comprises heat sink fins 340 for radiative heat transfer, and body threads 350 for threaded engagement with the fitting threads 370 of the compression fitting 230. The heat sink fins 340 are attached to the exterior 295 of the coupler body. Depending on the amount of heat to be dissipated, the fins 340 may not be necessary; it is also possible for the coupler body 200 to be actively cooled by Peltier devices, or by other methods, such as by immersion in an air stream, liquid bath, refrigerant (e.g. liquid nitrogen, liquid fluorinated hydrocarbon), or various phase change media (e.g. various salts, liquids, etc.) 500, as shown in FIG. 1. If the lens 270 is disposed in the inner bore 300, as shown in FIG. 2, then the fiber shelf 320 is preferably formed as shown in FIG. 2.

The compression fitting 230 also comprises a fitting entry 390, formed for the entry of one or more fibers 250, along with a fitting bore 360 and fitting neck 380 for the receipt and compression of the collet 210 and bushing 220.

The cold coupling apparatus 190 of the present invention has been found by way of experimentation to maintain the fiber 250 temperature at 120° C. or less (measured at an ambient temperature of 25° C.), when used in conjunction with a 250 watt metal halide illuminator such that the ends of the fibers are within 7.5 cm of the source of illumination.

The cold coupling apparatus 190 of the present invention functions in an optimal fashion when certain elements of the apparatus are fabricated from specific materials, more particularly, the coupler body 200 is most preferably fabricated from a heat-conductive material, such as aluminum, which has been black anodized to act as a black-body radiator. The lens 270, which is coated so as to block infrared and ultraviolet radiation, is generally loosely mounted against the lens shelf 310, and retained within the exit bore 280 by a steel lens ring 260. This system of loose mounting accommodates varied rates of expansion between the materials used to fabricate the coupler body 200, the lens 270, and the lens ring 260.

It has also been determined by experiment that, if two different lens coatings must be used, it is preferable to place the infrared coating of the lens 270 closer to the source of illumination than the ultraviolet coating, so as to minimize the amount of heat entering the coupler body 200 by way of the lens 270. The remaining heat within the entry bore 330 is conducted from the ferrules 240 on the ends of the fibers 250 to the coupler body 200 directly, or using the rods 245, or slug 247, as explained below.

The materials used to fabricate the (optional) collet 210 and bushing 220 are also important. The collet 210 is most preferably fabricated from a soft material which, when compressed around the fiber 250 cladding, will not distort the shape of the fiber 250. The material used to fabricate the collet 210 should also be resilient and deformable, so as to measily accommodate the compression forces imposed by the compression fitting 230, which are opposed by the outer surfaces of the fibers 250. The bushing 220 is most preferably made from rubber or a deformable polymer which provides for frictional engagement between the bushing 220 and the fibers 250. Compliant deformation is important to the function of the bushing 220 so as to provide the maximum amount of surface contact between the bushing 220 and the fibers 250 retained therein. Further, a material having a high coefficient of friction with respect to the outer cladding of the fibers 250 is also desirable.

Figure 3:
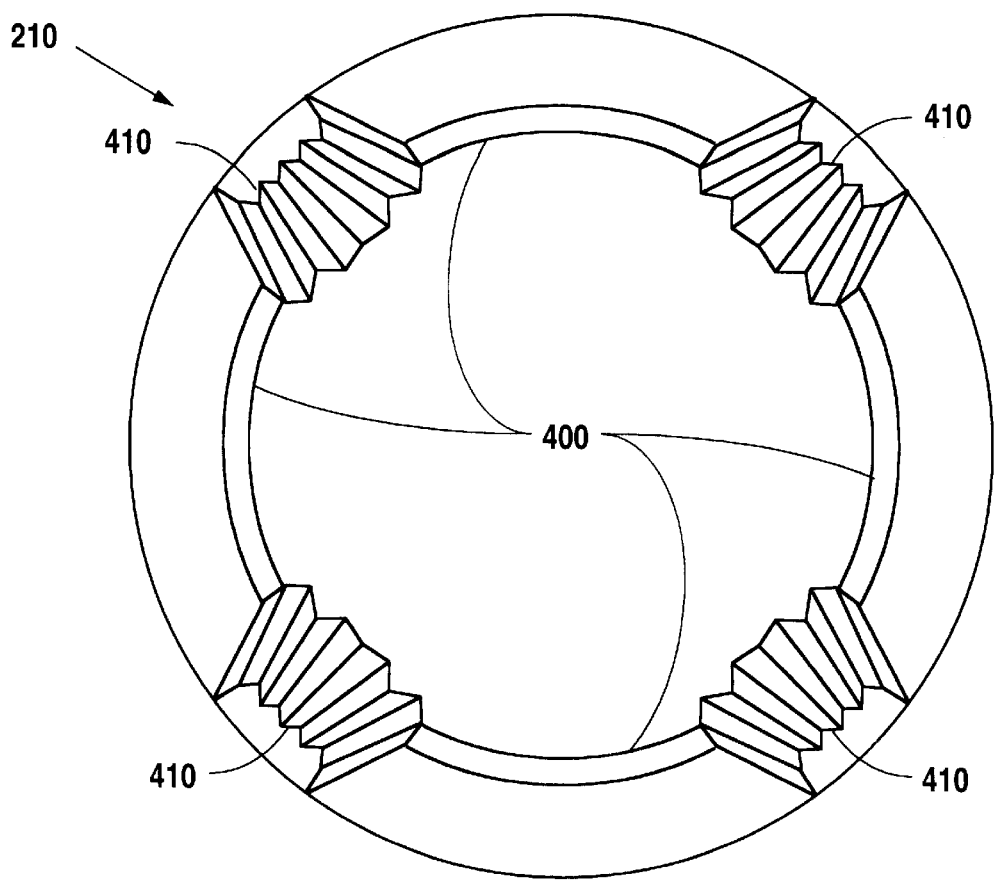
FIG. 3 is a perspective view of a collet which may be used in the present invention.

Turning now to FIG. 3, a perspective end-view of the collet can be seen. While any number of collet designs and clamping mechanisms may lend themselves to use with the present invention, it has been found by experimentation that forming the collet 210 from a set of fingers 400, interconnected by hinges 410, provides the optimal design for non-distorting compression of a fiber bundle within the coupler body 200. The collet 210 shown is most preferably used for retention of up to four large core fibers. However, more or less than this number can be used, the invention being adaptable to various numbers and sizes of fibers. The collet 210 itself may also be formed of a heat-conducting material for better cooling of the fibers contained therein. When only a single fiber is used, the collet 210 may not be necessary; sufficient retention of the fiber within the coupler body 200 may be achieved by using only the bushing 220 in conjunction with the compression fitting 230.

Figure 4:
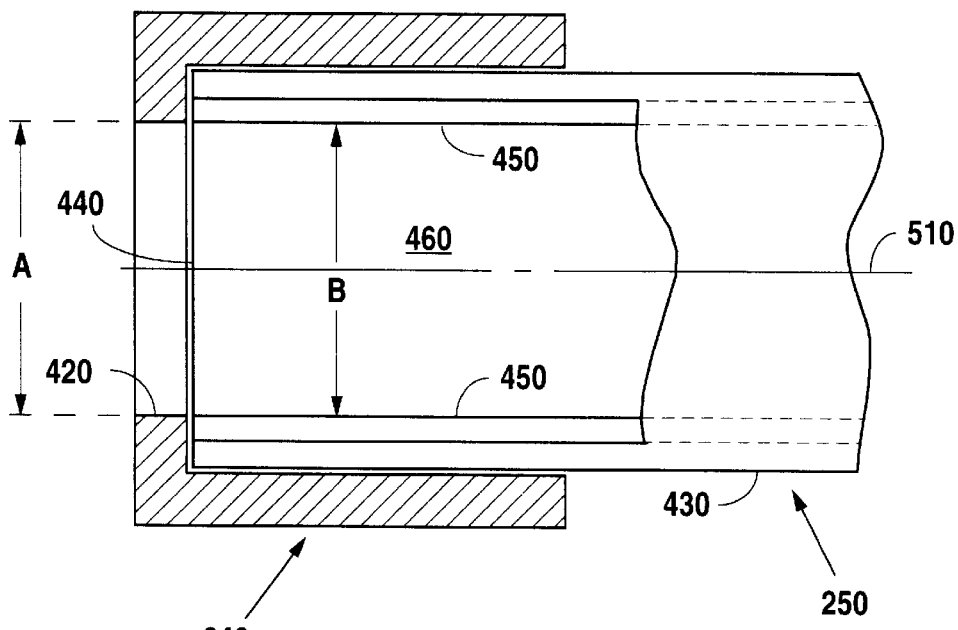
FIG. 4 is a side, cut-away, view of a ferrule which may be used in the present invention.

FIG. 4 illustrates a side cut-away view of the ferrule 240 used in the present invention, which serves several functions. First, each ferrule 240 which is placed over an individual fiber end 440, serves to maintain the circular shape of the fiber, promoting maximum illumination throughout the core 460 of the fiber transmission medium. Second, each ferrule 240 protects the corresponding fiber 250 from heat degradation. Without the use of such ferrules 240, heat from the illumination source causes the fiber jacket 430 to break down and form a gas which oxidizes over the fiber end 440, impairing light transmission. Employing ferrules 240 overcomes the oxidation problem, without removing the fiber jacket 430, avoiding damage to the protective cladding 450 and core 460 material. Third, the ferrules 240 provide a thermally conductive path from the fiber 250 to the coupler body 200. For large fiber bundles, wherein fibers exist that are not in direct contact with the collet 210, the ferrules 240 also conduct heat from the ends of these inner fibers, through other ferrules 240, to the coupler body 200.

To achieve maximum light transmission with minimal heat transfer, the ends of the ferrules 240 should be placed from about 1.2 mm to about 5.0 mm away from the proximate surface of the lens 270. Most preferably, the ends of the ferrules are placed from about 2.5 mm to about 3.1 mm away from the proximate surface of the lens 270. This distance can be varied; placing the ferrules 240 closer to the lens 270 increases the heat received by the fibers 250, and also increases the amount of light received. Placing the ferrules 240 further away decreases the amount of light received, and also decreases fiber heating.

The ferrules 240, which rest against the fiber shelf 320 when the cold coupling apparatus 190 is fully assembled, are generally fabricated so that the ferrule exit bore 420, shown by distance "A", is approximately the same diameter as the fiber optical core 460, shown by distance "B". Sizing the ferrule exit bore 420 to be about the same diameter as the fiber optical core 460 allows for maximum light transmission, while still providing adequate protection and secure retention of the fiber end 440. While FIG. 4 illustrates a solid core fiber, stranded or liquid core fibers may also be used.

Figure 5:
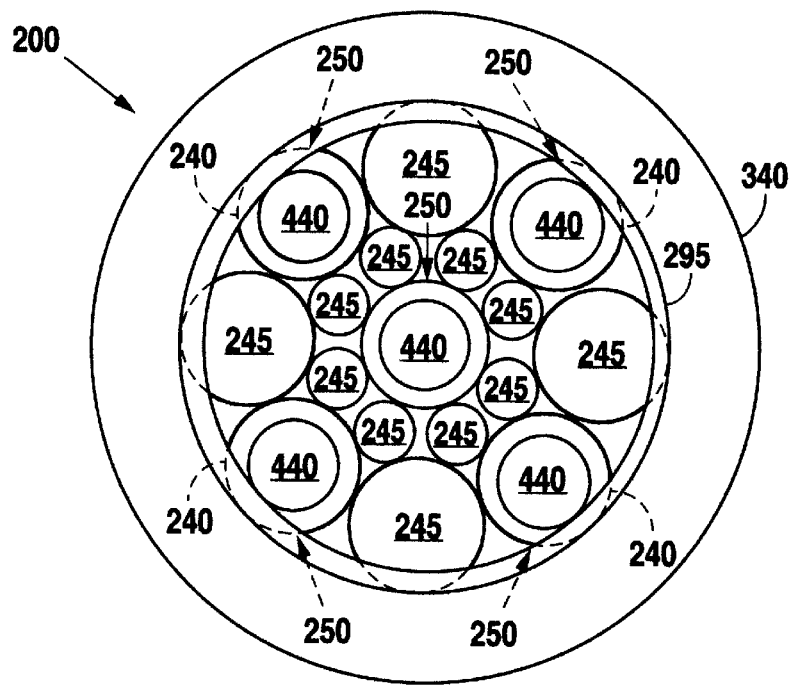
FIG. 5 is an end view of the present invention, utilizing rods disposed within the coupler body.
Figure 6:
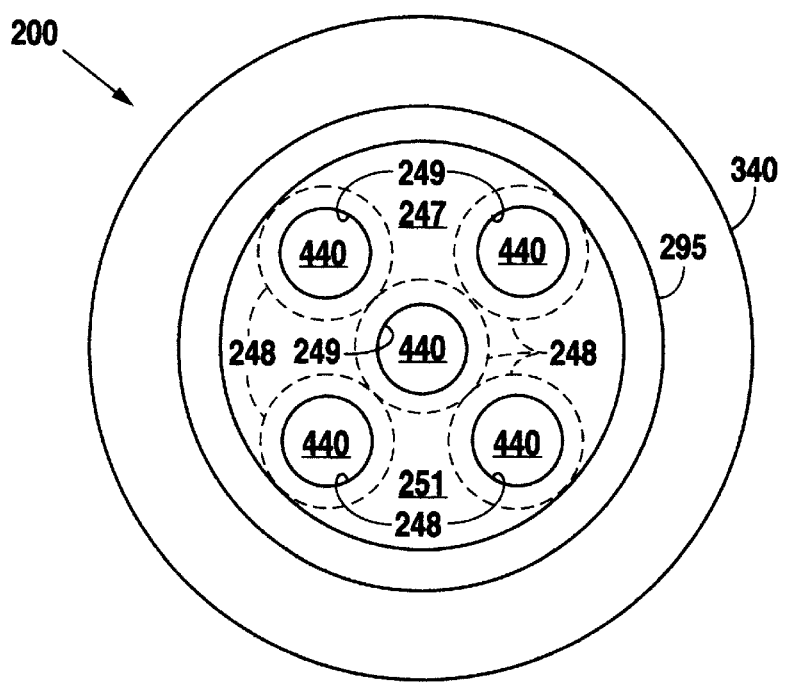
FIG. 6 is an end view of the present invention, utilizing a slug disposed within the coupler body.

FIGS. 5 and 6 provide end-view illustrations of alternative embodiments of the present invention. In FIG. 5, rods 245 are used to occupy the open space surrounding the fibers 250 within the coupler body 200. Such rods 245 can be made of any thermally conductive material, including, copper, brass, and aluminum. The rods 245 not only serve to center the fibers 250 within the coupler body 200, but also provide a thermal short between the ferrules 240 and the coupler body 200. The rods extend from the fiber shelf 320 past the collet 210 and the compression fitting 230. This length ensures distribution of strain along the coupler body 200 and uniform fiber bundle compression by the collet 210. The optimum application of force along the length of the fibers 250 (along the radial direction, and not the axial direction) results from using relatively long rods 245 (i.e. typically about the same length as the compression fitting 230) in conjunction with a relatively long collet 210 (i.e. at least twice as long as the diameter of the individual fibers 250, and more preferably, about four times as long as the individual fibers 250) to provide a higher gripping force with respect to a given amount of torque applied to the fitting 250, and taking advantage of the additional frictional forces supplied by the bushing 220.

Various sizes of rods 245 may be used to fill in the interstices between the fibers 250; ⅛ inch, ³⁄₁₆ inch, and ¼ inch diameter rods 245 are the most common sizes for use with similar-sized fibers 250. Of course, larger and smaller sizes of fibers 250 may also be accommodated; the rod 245 diameter being dictated by the number of fibers 250 enclosed within the coupler body 200, the entry bore 330 diameter of the coupler body 200, and size of the fibers 250. Hollow tubes may be used instead of solid rods 245 for reduced thermal mass, but lead to manufacturing and production problems due to burrs and other manufacturing defects. In addition, solid rods 245 serve to block extraneous light and result in more illumination being available at the fiber end 440. While the rods 245 are shown as being circularly shaped, shapes such as hexagonal, triangular, and other multi-sided geometric shapes may be used to fill in the interstices between the fibers 250.

FIG. 6 details a machined slug 247 that may also be used to provide a thermal short between the fibers 250 and the coupler body 200. Use of the slug 247 obviates the need for ferrules 240 and rods 245; the slug openings 249 which are cut into the front 251 are sized to expose only the core 260 of the fiber 200. However, the back 252 of the slug 247 has openings 248 sized to accommodate the entire jacket 430 of the fiber. The frontal openings 249 are therefore slightly smaller than the rear openings 248. This approach provides a stepped enclosure for the fibers 250 and prevents their penetration past the front 251 of the slug 247. While the slug 247 performs as well as the rods 245 for precise control of the fiber 250 position within the coupler body 200, it is also generally more expensive to implement and must be manufactured to accommodate a predetermined number of fibers 250 which are of a predetermined diameter and arranged in a predetermined pattern.

The most preferable method of securing the fibers 250 and the rods 245 (or with a slug 247) retained within the compression fitting 230 is to use a silicone closed-cell foam 520 wrapped around the fibers 250 and placed underneath the collet 210. This prevents the fibers 250 from sliding away from the compressive force of the collet 210 and the bushing 220 (if used) within the coupler body 200.

The present invention provides several advantages over the prior art discussed above. First, there is little or no air movement around the ends of the fiber in the present invention. Air movement typically brings dust, which degrades light transmission and requires periodic cleaning. Second, the compression fitting 230, combined with the collet 210 and bushing 220, maintains sufficient frictional engagement with the fibers 250 so as to retain them within the coupler body 200, without deforming the fibers 250 and reducing the transmission of light therein.

Third, the lens 270 provides the only interruption of the optical path between the source of illumination and the fibers 250. No intermediate, dissimilar materials, such as glass coupling rods, are necessary. This increases the amount of light which can be transmitted to the ends of the fibers 250, while providing a mechanism for blocking infrared and ultraviolet radiation, and dust. In addition, using the lens 270 provides an air barrier between the source and the fibers 250, which further insulates the ends of the fibers 440 from any heat that passes through the lens 270.

Fourth, the present invention simplifies field installation in that adhesives, splice connectors, and their associated attenuation are no longer required, since field-cut lengths of optical fiber can be installed directly in the cold coupling apparatus 190.

Fifth, the use of rods 245 or a slug 247 provides the ability to precisely position the fibers 250 within the coupler body 200 for optimal illumination of each fiber 250 and render heat dissipation concerns moot. Various sizes and types of fibers 250 can be easily accommodated such that the fiber jacket 430 does not have to be removed, as is done by some manufacturers, leading to a loss of mechanical strength in the fiber 250.

Sixth, the fibers 250, held in place by a series of rods 245 or a slug 247 do not tend to pull away from the coupler body 200 as the compression fitting is tightened onto the coupler body 200. In other words, the individual fibers 250 tend to remain evenly spaced from the source of illumination during the installation process, retaining the desired post-installation position.

The invention may also be characterized as a method of cooling a plurality of lightguiding fibers 250, wherein each one of the of the fibers 250 has a longitudinal axis 510. The method comprises the steps of inserting a plurality of fibers 250, a plurality of ferrules 240, and a plurality of rods 245 into a thermally conductive coupler body 200. Each ferrule 240 should be placed in proximate physical contact with, and partially covering, a corresponding one of the fibers 250. Each one of the ferrules 240 should be placed in proximate physical contact with at least one of the rods 245, and the rods 245 should be in parallel alignment with the longitudinal axes 510 of the fibers 250. The coupler body 200 has an engagement means 230, and a continous thermal path from the fibers 250 to the coupling body 200 is created by engaging a compression fitting 230 with the body engagement means 230 so as to secure the fibers 250, ferrules 240, and rods 245 within the coupling body 200, in physical contact with each other.

This method of cooling a fiber bundle is also effective when a bushing 220 is disposed within the compression fitting 230, and the rods 245 are solid members. However, hollow rods 245 can also be used. The rods 245 may be disposed adjacent to closed-cell foam 520, which is wrapped around the fibers 250 and co-located within the coupler body 200. As has been disclosed with respect to the apparatus of the invention, the coupler body 200 may further comprise an exterior 295 to which heat sink fins 340 are attached, and the coupler body 200 may be actively cooled.

Although the present invention is described in terms of preferred exemplary embodiments, other uses of the invention, such as transmitting light from an intense source of illumination to any other type of receiving mechanism which is heat-sensitive, are contemplated. Such uses are intended to fall within the scope of the following claims. Other aspects, features, and advantages of the present invention may be obtained from a study of this disclosure and the drawings, along with the appended claims.

What I claim is:

1. A cold coupling apparatus for receiving light from a source and transmitting the received light to the end of one or more light-guiding fibers, comprising:

a coupler body having a body engagement means formed thereon, an exit bore, an inner bore, and an entry bore, wherein the exit bore and the inner bore intersect to form a lens shelf, and the entry bore and the inner bore intersect to form a fiber shelf;

a lens disposed within the coupler body and proximate to the lens shelf;

a compression fitting engaged with the body engagement means;

one or more ferrules, each of said ferrules being disposed within the entry bore and proximate to the fiber shelf; and one or more rods, each of said rods being disposed within the entry bore and proximate to the one or more ferrules.

2. The cold coupling apparatus of claim 1, wherein the ferrules are placed from about 1.2 mm to about 5.0 mm away from the lens.

3. The cold coupling apparatus of claim 1, wherein the ferrules are placed from about 2.5 mm to about 3.1 mm away from the lens.

4. The cold coupling apparatus of claim 1, wherein the ferrules provide a thermally conductive path from the fibers to the coupler body.

5. The cold coupling apparatus of claim 1, further comprising a bushing disposed within the compression fitting.

6. The cold coupling apparatus of claim 1, wherein the rods are solid.

7. The cold coupling apparatus of claim 1, wherein the rods are hollow.

8. The cold coupling apparatus of claim 1, wherein the rods are disposed proximately to a closed-cell foam disposed within the coupler body.

9. The cold coupling apparatus of claim 1, wherein the coupler body further comprises an exterior and heat sink fins are attached to the exterior of the coupler body.

10. The cold coupling apparatus of claim 1, wherein the coupler body is actively cooled.

11. A cold coupling apparatus for receiving light from a source and transmitting the received light to the end of one or more light-guiding fibers, comprising:
   a coupler body having a body engagement means formed thereon, an exit bore, an inner bore, and an entry bore, wherein the exit bore and the inner bore intersect to form a lens shelf, and the entry bore and the inner bore intersect to form a fiber shelf;
   a lens disposed within the coupler body and proximate to the lens shelf;
   a compression fitting engaged with the body engagement means; and
   a slug having a front face and a rear face, said slug being disposed within the entry bore and proximate to the fiber shelf.

12. The cold coupling apparatus of claim 11, wherein the slug front face is placed from about 1.2 mm to about 5.0 mm away from the lens.

13. The cold coupling apparatus of claim 11, wherein the slug front face is placed from about 2.5 mm to about 3.1 mm away from the lens.

14. The cold coupling apparatus of claim 11, wherein the slug front face includes frontal openings and the slug rear face includes rear openings which are of larger diameter than the frontal openings.

15. The cold coupling apparatus of claim 14, wherein the rear openings are larger than the diameter of the fibers.

16. The cold coupling apparatus of claim 11, wherein the slug provides a thermally conductive path from the fibers to the coupler body.

17. The cold coupling apparatus of claim 11, further comprising a bushing disposed within the compression fitting.

18. The cold coupling apparatus of claim 11, wherein the slug is proximate to a closed-cell foam disposed within the coupler body.

19. The cold coupling apparatus of claim 11, wherein the coupler body further comprises an exterior and heat sink fins are attached to the exterior of the coupler body.

20. The cold coupling apparatus of claim 11, wherein the coupler body is actively cooled.

21. A method of cooling a plurality of light-guiding fibers, wherein each one of the plurality of fibers has a longitudinal axis, comprising the steps of:
   inserting the plurality of fibers into a thermally conductive coupler body having an engagement means;
   inserting a plurality of ferrules into the thermally conductive coupler body, such that each one of the ferrules is in proximate physical contact with and partially covers a corresponding one of the fibers;
   inserting a plurality of rods into the coupler body, each one of the plurality of ferrules being in proximate physical contact with at least one of the plurality of rods, the plurality of rods being in parallel alignment with the longitudinal axes of the plurality of fibers; and
   creating a continuous thermal path from the plurality of fibers to the coupling body by engaging a compression fitting with the body engagement means so as to secure the relative locations of the plurality of fibers, ferrules, and rods within the coupling body.

22. The coupling method of claim 21, wherein a bushing is disposed within the compression fitting.

23. The coupling method of claim 21, wherein the rods are solid.

24. The coupling method of claim 21, wherein the rods are hollow.

25. The cold coupling method of claim 21, wherein the rods are disposed proximately to a closed-cell foam located within the coupler body.

26. The coupling method of claim 21, wherein the coupler body further comprises an exterior and heat sink fins are attached to the exterior of the coupler body.

27. The coupling method of claim 21, wherein the coupler body is actively cooled.

* * * * *